United States Patent
Newman et al.

(10) Patent No.: US 10,489,419 B1
(45) Date of Patent: Nov. 26, 2019

(54) DATA MODELING TRANSLATION SYSTEM

(71) Applicant: Wells Fargo Bank, N.A., San Francisco, CA (US)

(72) Inventors: David Newman, Walnut Creek, CA (US); Devdeep Kabiraj, Cupertino, CA (US); Gerald Quigley, San Rafael, CA (US); Caroline Janice Day, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 190 days.

(21) Appl. No.: 15/471,728

(22) Filed: Mar. 28, 2017

Related U.S. Application Data (60) Provisional application No. 62/314,338, filed on Mar. 28, 2016.

(51) Int. Cl.
| | |
|---|---|
| *G06F 16/30* | (2019.01) |
| *G06F 16/25* | (2019.01) |
| *G06F 16/84* | (2019.01) |
| *G06F 16/28* | (2019.01) |
| *G06F 16/36* | (2019.01) |
| *G06F 16/33* | (2019.01) |

(52) U.S. Cl.
CPC .......... *G06F 16/258* (2019.01); *G06F 16/284* (2019.01); *G06F 16/3344* (2019.01); *G06F 16/367* (2019.01); *G06F 16/86* (2019.01)

(58) Field of Classification Search
CPC ...... G06F 16/258; G06F 16/86; G06F 16/284; G06F 16/367; G06F 16/3344
See application file for complete search history.

(56) References Cited

U.S. PATENT DOCUMENTS

| | | | |
|---|---|---|---|
| 2009/0106234 A1* | 4/2009 | Siedlecki | G06Q 30/0276 |
| 2010/0185637 A1 | 7/2010 | Morris et al. | |
| 2012/0023055 A1 | 1/2012 | Dagaeff | |
| 2012/0303611 A1 | 11/2012 | Kusumura et al. | |
| 2012/0323741 A1 | 12/2012 | Rangachari et al. | |
| 2013/0054621 A1* | 2/2013 | Kretz | G06F 16/367 |
| | | | 707/749 |

(Continued)

OTHER PUBLICATIONS

Non-Patent literature document titled "Mapping Hierarchical Sources into RDF using the RML Mapping Language" dated May 20, 2015 Anastasia Dimou et al (Year: 2015).*

(Continued)

*Primary Examiner* — Tarek Chbouki (74) *Attorney, Agent, or Firm* — Schwegman Lundberg & Woessner, P.A.

(57) ABSTRACT

A method may include receiving a semantic query, wherein the semantic query is formatted using a first ontology; retrieving a transitive mapping between the first ontology and a second ontology; translating a first element of the semantic query from the format of the first ontology to a second element of the second ontology in accordance with the transitive map; parsing a relational database to Resource Description Format (R2RML) mapping to determine a set of database tables that include the second element; directing an execution of the semantic query to the set of database tables in accordance with the R2RML mapping; and storing the results of the executed query in a tripe format, the stored results formatted using the first ontology.

20 Claims, 3 Drawing Sheets

(56) References Cited

U.S. PATENT DOCUMENTS

| | | |
|---|---|---|
| 2014/0025643 A1 | 1/2014 | Baldwin et al. |
| 2014/0156638 A1* | 6/2014 | Joshi ............... G06F 16/254 |
| | | 707/722 |
| 2016/0078016 A1* | 3/2016 | NG Tari ............ G06F 16/367 |
| | | 707/723 |
| 2016/0196360 A1* | 7/2016 | Best ................. G06F 16/367 |
| | | 707/722 |

OTHER PUBLICATIONS

"U.S. Appl. No. 15/645,574, Non Final Office Action dated Apr. 5, 2019", 11 pgs.

"U.S. Appl. No. 15/645,574, Response filed Jul. 3, 2019 to Non Final Office Action dated Apr. 5, 2019", 10 pgs.

U.S. Appl. No. 15/645,574, filed Jul. 10, 2017, Semantic Translation of Data Sets.

* cited by examiner

DATA MODELING TRANSLATION SYSTEM

PRIORITY APPLICATION

This application claims priority to U.S. Provisional Application Ser. No. 62/314,338, filed Mar. 28, 2016, the disclosure of which is incorporated herein in its entirety by reference.

BACKGROUND

Data may be stored in a variety of database paradigms. For example, a relational database may include one or more tables that are linked using a primary key (e.g., a column). A flat file database may be a character delineated file without explicit relationship links. Different management systems may be used to extract, transform, and load data (ETL) into a database. For example, a relational database management system may use structured query language (SQL) statements to retrieve data from the database.

Another type of database, a graph database may be used for related data. Nodes of the database may represent objects, edges may connect the nodes to indicate a relationship, and properties may indicate information about the edges and nodes. A triplestore (sometimes referred to a resource description framework (RDF) store) is a type of graph database often used for semantic data that conforms to the subject-predicate (or property)-object format.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

An ontology may be as a taxonomy of objects for a given field-different fields may use different ontologies. The ontology may identify types, properties, and interrelationships between the objects. When used in the electronic realm, an ontology may be used to determine if data complies with the ontology. In some examples, the definition of an ontology is described a schema.

As a simple example, consider a schema for a Person object. The schema may include a number of entries that define the properties of a Person object such as "given name," "height," "weight," etc., and the properties may also have expected types. Thus, the "height" property may have a quantitative type where as "given name" may be text. The excepted type of an object may be another object such as a property of "knows" having an expected type of Person. Accordingly, the data string "Alice knows Bob" can be thought of as two Person objects with the Alice having the "knows" property.

Another way to consider ontologies is using a "Subject, Predicate, Object" (S-P-O) triple format. Using the example of "Alice knows Bob," Alice is the subject, the predicate is "knows," and the object is "Bob." With reference back to our example Person schema, the predicate is the property in the schema and the expected type is the object. In other words, a schema may semantically define valid relationships between multiple objects—the general class of which is referred to herein as a semantic ontology.

When used on a web-based network (the internet of an intranet), underlying relationships and rules for a semantic ontology may be stored in a variety of formats including, but not limited to, Resource Description Framework (RDF) Schema, web ontology language (OWL), and the Rule Interchange Format (RIF). These formats in turn are based on other standardized data formats such as Extensible Markup Language (XML) and Uniform Resource Identifier (URI).

An entity (e.g., company) often stores data in one or more databases (e.g., relational, non-relational, flat file, etc.) having one or more tables. Data in a database generally conforms to a schema. In the case of relationship databases, the schema may define how the number of format requirements of the various tables and what columns serve as primary and secondary keys. Tables may be linked to each other using these keys. For example, a customer table may include a customer identifier column (set as the primary key) and an address column. An order table may include an order column (set as the primary key) and a customer identifier column. An SQL query (in the case of a relational database) to find all customer orders for a given customer identifier may result in a series of rows that include the customer identifier, the customer name, and the order identifier.

Even within a common entity, challenges present themselves when trying to query databases because different people and groups within the entity may create database tables using different column identifiers. Thus, one line of business may use "CUST_ID" as the column identifier for a customer and another line of business may use "CUSTOMER_ID." Consequently, continuing the example above, finding all orders for a customer may involve knowing how each database table refers to a customer identifier—this is true even if the underlying identifier is the same. When there are hundreds of lines of business, the problem only becomes that much greater.

For example, consider that an entity wants to see how many of its customers would be affected if a security policy is updated or the entity may want to update the security clearance policy of a group of people. And consider that the update will affect all American citizens that have been customers of a particular line of business for longer than two years. Just in this example there may be at least three properties that need to be checked: (1) citizenship; (2) participation in a line of business; and (3) length of time as a participant. Given that each line of business may use different identifiers for any or all three of these properties, determining the customer impact or updating the security clearances manually may be exceedingly difficult, if not impossible, when time is of the essence.

An entity may have use a defined semantic ontology (or more than one) to describe its users and associated data structures. For example, a retail company may have an ontology with a customer object and an order object. A bank may have an ontology that has a customer object and a financial accounts object. The customer object may also have a property of a security class.

Using a semantic ontology may allow queries using the S-P-O format to find relevant data for an entity. However, the semantic ontology alone may not solve the problem above unless a mapping is defined between the database elements and the semantic ontology. Solving this problem may be especially challenging for existing companies that have many existing disparate databases for the reasons discussed previously.

A relational database (RDB) to RDF mapping proposed W3C standard exists called R2RML. One purpose of R2RML is to facilitate a map of existing relational data—as encapsulated in one or more databases—to the RDF data model. The input for an R2RML mapping is a logical table that may be a base table, a view, or a valid SQL query. The output of the R2RML is a mapping of the logical table to a RDF using a triple map. A triple map is a rule that takes each row in one of the logical tables to an RDF triple. The rule may have two components, the subject map and a multiple predicate-object map, which may be made up of predicate maps and object maps. The triple for a given database row may be formulated by combining the subject map with a predicate map and an object map.

The proposed W3C documentation provides the following, slightly modified, example. Consider a database table EMP. The EMP table includes three columns: EMPNO, ENAME, JOB. A row of the EMP table is "7639:SMITH: CLERK." A triple map may for the EMP table may be:
@prefix rr: <http://www.w3.org/ns/r2rml#>.
@prefix ex: <http://example.com/ns#>.
<#TriplesMap1>
　　rr:logicalTable [ rr:tableName "EMP" ];
　　rr:subjectMap [
　　rr:template
"http://data.example.com/employee/{EMPNO}";
　　rr:class ex:Employee;
　　];
　　rr:predicateObjectMap [
　　rr:predicate ex:name;
　　rr:objectMap [ rr:column "ENAME" ];
　　].
The output of the R2RML may be
<http://data.example.com/employee/7369> rdf:type ex:Employee.
<http://data.example.com/employee/7369>　　ex:name "SMITH".

In various examples, machine learning algorithms are employed to find common elements across different database tables. A common element may be an element that includes the same data but is identified differently across tables, lines of business, etc. A machine learning algorithm may look for commonalties across many data sources to determine the sets of identifiers that refer to common elements. For example, the machine learning algorithm may determine that "CUST" from table A and "CUST_ID" from table B are both referring to a customer identifier. Inputs to the algorithm may include not only the database tables, but other data files as well such as spreadsheets, e-mails, word documents, etc. The algorithm may use these documents to increase the confidence that each identifier for a given set is referring to a common element. Because many different identifiers may be used, the algorithm may adopt the most common identifier to refer to the element as a whole. A semantic ontology may be created based on the common identifiers.

In some instances, the output of the algorithm may be R2RML mappings between the tables and the semantic ontology. Continuing the W3C example previously discussed, consider that another table exists called "EMPLOYEES" with columns "EMP_NUM, ENAME, EJOB" with a row of "7639:SMITH:CLERK." The machine learning algorithm may look at the data in the EMPLOYEES table and see that the rows are identical even though the column identifiers are different. Accordingly, a triple map may be
@prefix rr: <http://www.w3.org/ns/r2rml#>.
@prefix ex: <http://example.com/ns#>.
<#TriplesMap1>
　　rr:logicalTable [ rr:tableName "EMPLOYEES" ];
　　rr:subjectMap [
　　rr:template
"http://data.example.com/employee/{EMP_NUM}";
　　rr:class ex:Employee;
　　];
　　rr:predicateObjectMap [
　　rr:predicate ex:name;
　　rr:objectMap [ rr:column "ENAME" ];
　　].

Even though the R2RML output is based on a semantic ontology, an entity may not be able to utilize this knowledge without modification. In other words, the ontology of the machine learning algorithm may not match an entity's ontology. Accordingly, an employee of the entity that wants to determine the impact of a change still may not be able to do so. However, the entity may leverage the R2RML output to solve this problem. For example, the ontology of the R2RML may be mapped to the entity's internal semantic ontology. Thus, if a query is run to find all American citizens that have been customers of a particular line of business for longer than two years the query may be expressed in the entity's ontology first. Then, the map between the entity's ontology and the ontology of the R2RML output may be consulted to determine all the identifiers used for citizenship, line of business (LOB), and length of participation for the LOB. A SQL query may then be run that includes all the identifiers to see the number of customers impacted, etc.

In various examples, determining the map between the R2RML ontology and entity ontology is partially or completely automated. For example, the entity may already indicate (e.g., in a structured format such as an XML file) some table column identifiers that correlate with the entity's semantic ontology. Accordingly, the R2RML mappings may be parsed to look for the indicated column identifiers and what element the R2RML has used for such an identifier. A transitive map may be stored that maps the R2RML element identifier with the entity's element identifier. An entity may also generate its own R2RML document using its own ontology based on the transitive map.

Figure 1:
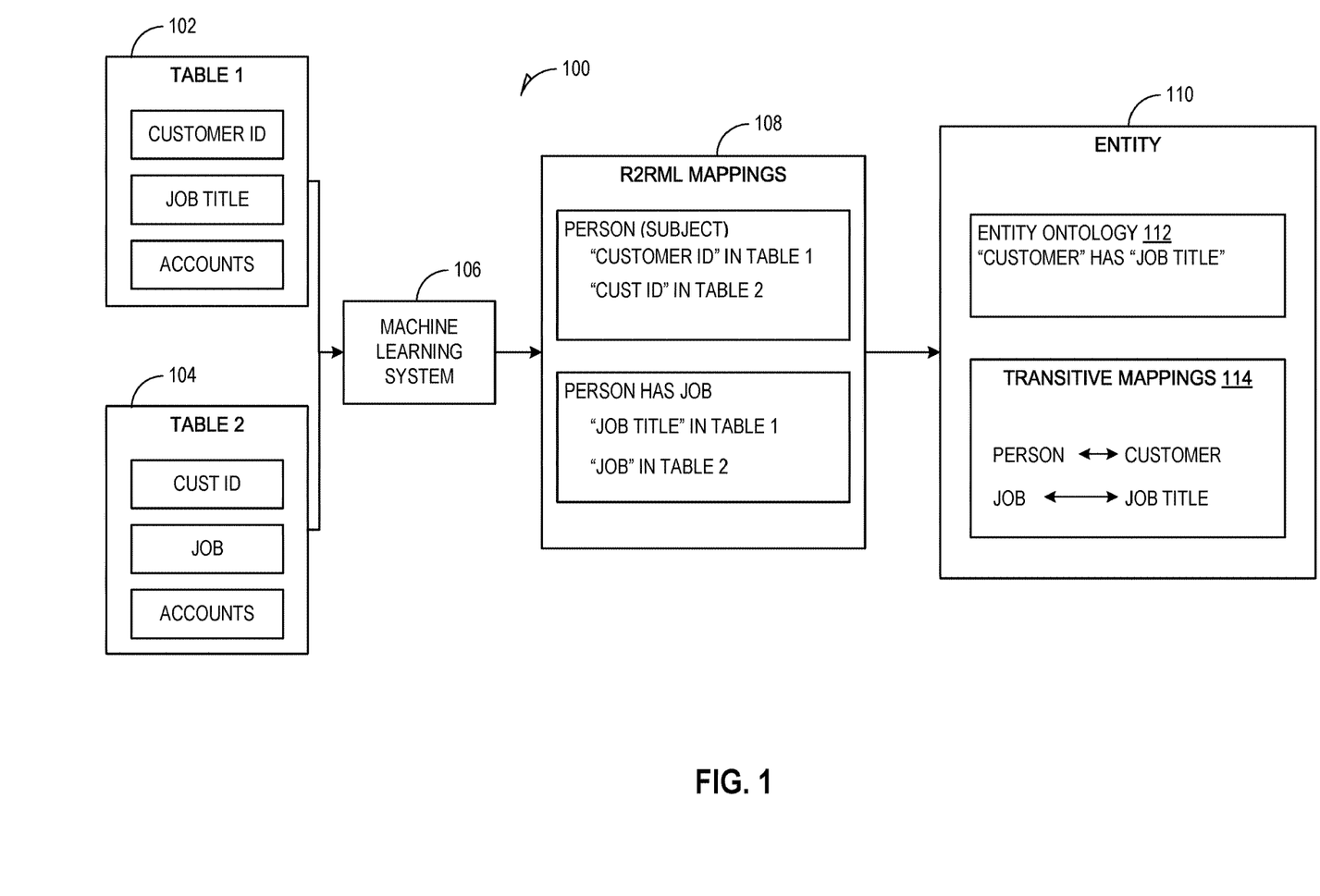
FIG. 1 illustrates a schematic diagram of a system using R2RML mappings, according to an example embodiment.

FIG. 1 illustrates a schematic diagram of a system 100 using R2RML mappings, according to an example embodiment. FIG. 1 illustrates tables 102 and 104, machine learning system 106, R2RML mappings 108, and entity 110. Although not illustrated as such, the tables 102 and 104 may be part of one or more databases residing in storage devices of the entity 110. The databases may be stored in a single location or distributed across multiple locations. Additionally, the machine learning system 106 may be a web service or stand-alone application executing remotely or within entity 110. The machine learning system 106 may communicate with the entity 110 via a network (e.g., the internet or an intranet).

The machine learning system 106 may traverse and parse data sources of the entity 110 to generate the R2RML mappings 108 using methodologies described above. The data sources may include the tables 102 and 104 as well as data sources not illustrated (e.g., word documents, excel documents, e-mails, etc.). The R2RML mappings 108 may include identifications of which columns in the tables correspond to an ontology—as organized in an RDF schema of the machine learning system 106. The information in the mappings 108 is not in the R2RML format for illustration purposes, but conveys the information included in the mappings. For example, a person object is represented as both "customer ID" in table 102 and "cust ID" in table 104. The precise format of the R2RML mappings 108 may set according to the R2RML standard. The subject matter disclosed herein is not limited to R2RML mappings and other translation mechanisms between data storage locations and ontologies may be used.

The entity 110 may have its own internal ontology 112 organized using RDF or other semantic ontology format. Over time, the entity 110 may store its own R2RML mappings—or other database to RDF translation—that indicate where data corresponding to a triple (Subject, Predicate, Object) are located within the databases, or other data sources, of the entity 110.

As with the R2RML mappings the information depicted in the entity ontology 112 and transitive mappings 114 within entity 110 are for discussion purposes. As shown, the entity ontology 112 defines a "Customer" as having a "Job Title." The transitive mappings 114 indicate that the "Person," of the ontology used within the R2FML mappings, corresponds to the "Customer" of the entity ontology 112. Similarly, "Job" corresponds to "Job Title" of the entity ontology 112.

The transitive mappings 114 may be persistently stored, dynamically determined during a query, manually entered, or a combination thereof. For example, if an R2RML mapping of the entity already indicates that the "Customer ID" of Table 1 corresponds to the "Customer" Subject, it can be inferred that the "Person" Subject of R2RML mappings 108 is the "Customer" Subject of the entity ontology 112—because they both indicate the sources as "Customer ID" of Table 1. Consequently, an automatic text parser may be used to compare the R2RML mappings 108 with an R2RML map of the entity 110 and find matches.

In some examples, an interface is presented with all or a subset of the ontology terms used in the R2RML mappings and the entity mappings. A suggested pairing may be illustrated (e.g., graphically using a line, in a spreadsheet with two columns, etc.) and a user may be able to confirm or change the pairing (e.g., using a checkbox, drag and dropping of one term to another, etc.). The pairings based on comparing the entity R2RML document as described above. The pairings may also be suggested when the same term appears in both R2RML documents.

Figure 2:
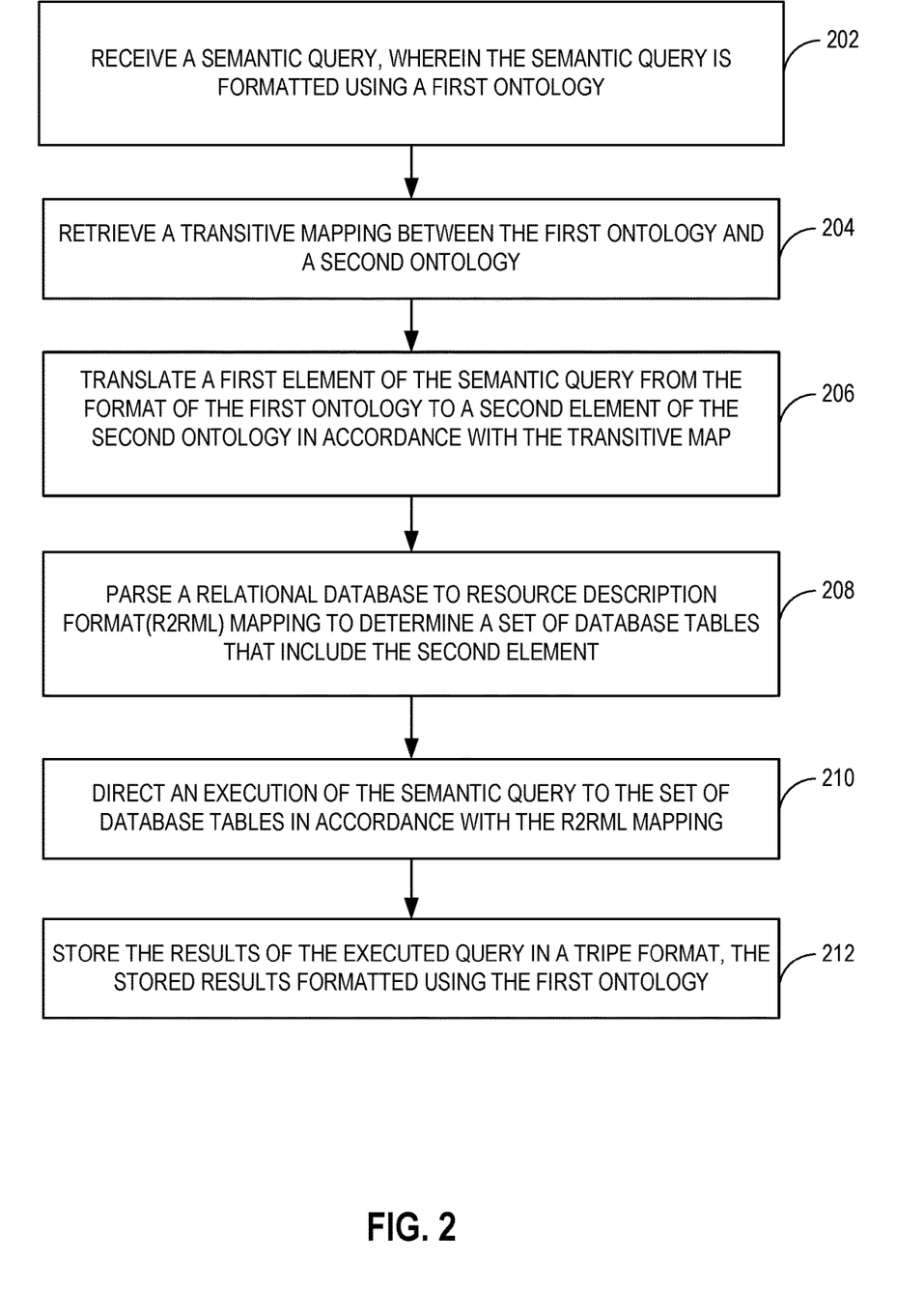
FIG. 2 is a flowchart depicting a method for using R2RML mappings, according to various embodiments.

The transitive mappings 114 may be used when an SQL or semantic query is made against the databases of the entity. FIG. 2 is a flowchart depicting a method for using R2RML mappings, according to various embodiments. At operation 202, a semantic query is received. For example, "Find all customers that are accountants." The query may be received at a web server or stand-alone application of the entity.

At operation 204, a transitive mapping between a first ontology and a second ontology may be received. The first ontology may be a semantic ontology of an entity. The second ontology may be the ontology used by another entity, such as a system providing machine learning services.

At operation 206, a first element of the semantic query may be translated from the first ontology to a second element of the second ontology using a transitive map. For example, the query may be parsed to determine a term (e.g., the first element) for an object of the query. The transitive map may be parsed to find the term. The transitive map may include a corresponding term (e.g., the second element) from the second ontology. In some instances, there may be an intermediary step to determine the element. For example, "accountant" may be a property of a "Job Title" element. Consequently, "Job Title" would be searched in the transitive map and it may be determined that the corresponding second element is "Job"

At operation 208, a relational database to resource description format mapping (R2RML) is parsed to determine a set of database tables that include the second element. For example, an R2RML map may indicate that "Job" is found as column XYZ in table 1 and column ABC in table 2. At operation 210, the execution of the semantic query may be directed to the set of database tables in according with the R2RML mapping.

At operation 212, the results of the executed query may be stored in a triple format, formatted using the first ontology. In various examples, a translation may be needed between the second ontology and first ontology using the transitive map before the results are stored. The results may be stored temporarily or persistently.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times.

Software may accordingly configure a hardware processor, for example, to constitute a particular module at one instance of time and to constitute a different module at a different instance of time. Modules may also be software or firmware modules, which operate to perform the methodologies described herein.

Figure 3:
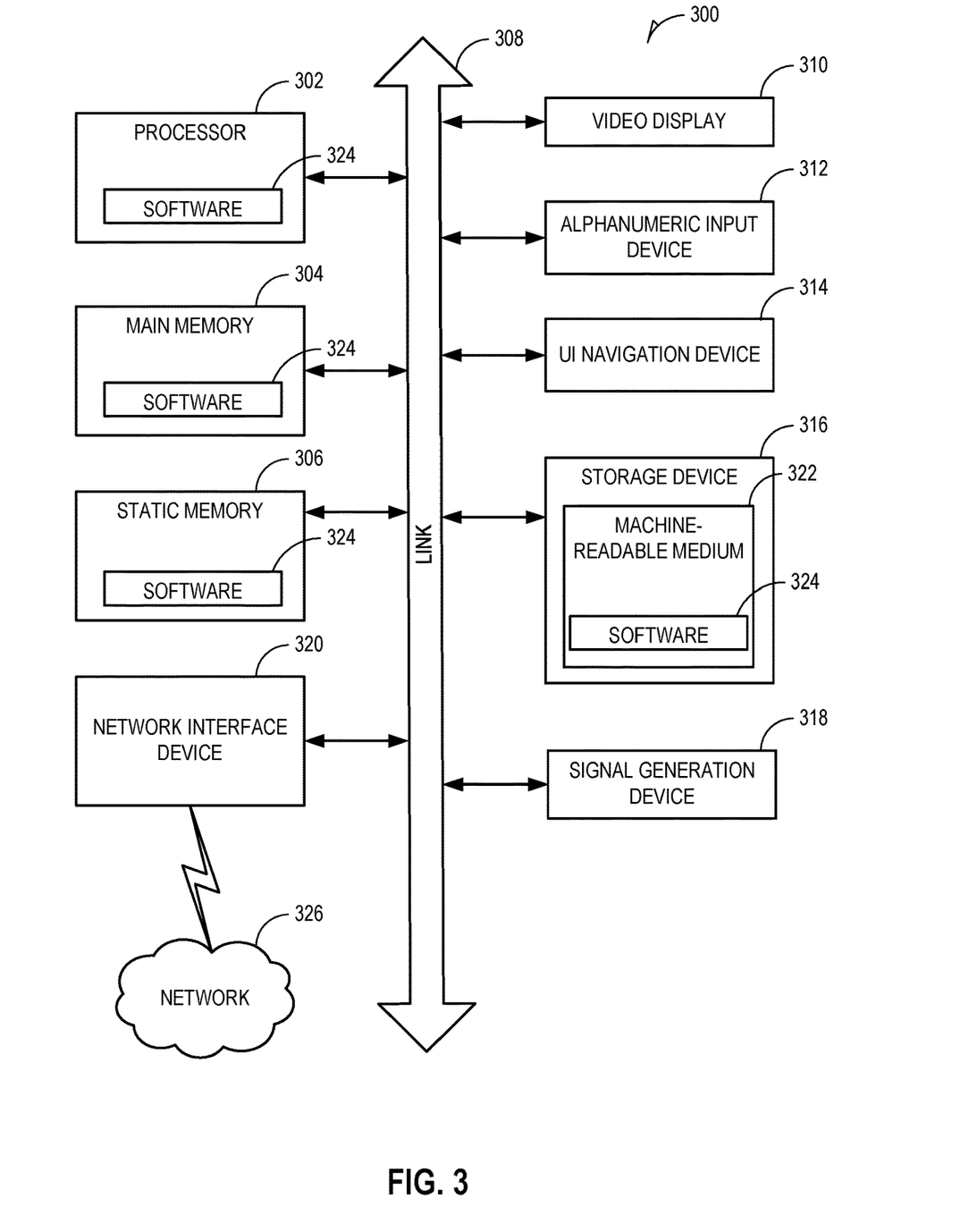
FIG. 3 is a block diagram illustrating an example machine upon which any one or more of the techniques (e.g., methodologies) discussed herein may be performed, according to an example embodiment.

FIG. 3 is a block diagram illustrating a machine in the example form of a computer system 300, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The computer system 300 may further include a video display unit 310, an alphanumeric input device 312 (e.g., a keyboard), and a user interface (UI) navigation device 314 (e.g., a mouse). In one embodiment, the video display unit 310, input device 312 and UI navigation device 314 are incorporated into a touch screen display. The computer system 300 may additionally include a storage device 316 (e.g., a drive unit), a signal generation device 318 (e.g., a speaker), a network interface device 320, and one or more sensors (not shown), such as a global positioning system (GPS) sensor, compass, accelerometer, or other sensor.

The storage device 316 includes a machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computer system 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 324 may further be transmitted or received over a communications network 326 using a transmission medium via the network interface device 320 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
    receiving a semantic query, wherein the semantic query is formatted using a first ontology;
    retrieving a transitive mapping between the first ontology and a second ontology;
    translating a first element of the semantic query from the format of the first ontology to a second element of the second ontology in accordance with the transitive map;
    parsing a relational database to Resource Description Format (R2RML) mapping to determine a set of database tables that include the second element, the R2RML mapping associated with the second ontology;
    directing an execution of the semantic query to the set of database tables in accordance with the R2RML mapping to retrieve data associated with the second element; and
    storing the results of the executed query in a triple format, the stored results formatted using the first ontology.

2. The method of claim 1, wherein the first ontology is associated with a first entity and the second ontology is associated with a second entity.

3. The method of claim 1, wherein translating a first element of the semantic query from the format of the first ontology to a second element of the second ontology in accordance with the transitive map comprises:
parsing the transitive map to find the first element, and wherein the transitive map includes the second element as a corresponding term to the first element.

4. The method of claim 1, further comprising:
parsing the query to determine the first element, wherein the first element is a property of an object of the query.

5. The method of claim 1, further comprising:
presenting a user interface that includes:
a plurality of terms from the first ontology;
a plurality of terms from the second ontology; and
a suggested pairing between a term of the plurality of terms from the first ontology and a term of the plurality of terms from the second ontology.

6. The method of claim 5; wherein the suggested pairing is based on the term of the plurality of terms from the first ontology and the term of the plurality of terms from the second ontology being the same.

7. The method of claim 5, further comprising:
receiving, via the user interface, confirmation of the suggested pairing.

8. A non-transitory computer readable medium comprising instructions, which when executed by at least one processor, configure the processor to perform operations comprising:
receiving a semantic query, wherein the semantic query is formatted using a first ontology;
retrieving a transitive mapping between the first ontology and a second ontology;
translating a first element of the semantic query from the format of the first ontology to a second element of the second ontology in accordance with the transitive map;
parsing a relational database to Resource Description Format (R2RML) mapping to determine a set of database tables that include the second element, the R2RML mapping associated with the second ontology;
directing an execution of the semantic query to the set of database tables in accordance with the R2RML mapping to retrieve data associated with the second element; and
storing the results of the executed query in a triple format, the stored results formatted using the first ontology.

9. The non-transitory computer readable medium of claim 8, wherein the first ontology is associated with a first entity and the second ontology is associated with a second entity.

10. The non-transitory computer readable medium of claim 8, wherein the operation of translating a first element of the semantic query from the format of the first ontology to a second element of the second ontology in accordance with the transitive map comprises:
parsing the transitive map to find the first element, and wherein the transitive map includes the second element as a corresponding term to the first element.

11. The non-transitory computer readable medium of claim 8, the operations further comprising:
parsing the query to determine the first element, wherein the first element is a property of an object of the query.

12. The non-transitory computer readable medium of claim 8, the operations further comprising:
presenting a user interface that includes:
a plurality of terms from the first ontology;
a plurality of terms from the second ontology; and
a suggested pairing between a term of the plurality of terms from the first ontology and a term of the plurality of terms from the second ontology.

13. The non-transitory computer readable medium of claim 12, wherein the suggested pairing is based on the term of the plurality of terms from the first ontology and the term of the plurality of terms from the second ontology being the same.

14. The non-transitory computer readable medium of claim 12, the operations further comprising:
receiving, via the user interface, confirmation of the suggested pairing.

15. A system comprising:
at least one processor;
a storage device comprising instructions, which when executed by the at least one processor, configure the processor to perform operations comprising:
receiving a semantic query, wherein the semantic query is formatted using a first ontology;
retrieving a transitive mapping between the first ontology and a second ontology;
translating a first element of the semantic query from the format of the first ontology to a second element of the second ontology in accordance with the transitive map;
parsing a relational database to Resource Description Format (R2RML) mapping to determine a set of database tables that include the second element, the R2RML mapping associated with the second ontology;
directing an execution of the semantic query to the set of database tables in accordance with the R2RML mapping to retrieve data associated with the second element; and
storing the results of the executed query in a triple format, the stored results formatted using the first ontology.

16. The system of claim 15, wherein the first ontology is associated with a first entity and the second ontology is associated with a second entity.

17. The system of claim 15, wherein the operation of translating a first element of the semantic query from the format of the first ontology to a second element of the second ontology in accordance with the transitive map comprises:
parsing the transitive map to find the first element, and wherein the transitive map includes the second element as a corresponding term to the first element.

18. The system of claim 15, the operations further comprising:
parsing the query to determine the first element, wherein the first element is a property of an object of the query.

19. The system of claim 15, the operations further comprising:
presenting a user interface that includes:
a plurality of terms from the first ontology;
a plurality of terms from the second ontology; and
a suggested pairing between a term of the plurality of terms from the first ontology and a term of the plurality of terms from the second ontology.

20. The system of claim 19, wherein the suggested pairing is based on the term of the plurality of terms from the first ontology and the term of the plurality of terms from the second ontology being the same.

* * * * *

UNITED STATES PATENT AND TRADEMARK OFFICE
CERTIFICATE OF CORRECTION

PATENT NO. : 10,489,419 B1
APPLICATION NO. : 15/471728
DATED : November 26, 2019
INVENTOR(S) : Newman et al.

Page 1 of 1

It is certified that error appears in the above-identified patent and that said Letters Patent is hereby corrected as shown below:

In the Claims

In Column 9, Line 18, in Claim 6, delete "claim 5;" and insert --claim 5,-- therefor Signed and Sealed this
Twenty-ninth Day of September, 2020

Andrei Iancu
*Director of the United States Patent and Trademark Office*